US 7,568,213 B2
Jul. 28, 2009

(12) United States Patent
Carhart et al.

(10) Patent No.: US 7,568,213 B2
(45) Date of Patent: Jul. 28, 2009

(54) METHOD FOR PROVIDING EPISODIC MEDIA CONTENT

(75) Inventors: Tom Carhart, Menlo Park, CA (US); Murgesh Navar, San Jose, CA (US); Sergiy Bilobrov, Coquitlam (CA); Andrey Yruski, Pacifica, CA (US)

(73) Assignee: VoloMedia, Inc., Sunnyvale, CA (US)

( * ) Notice: Subject to any disclaimer, the term of this patent is extended or adjusted under 35 U.S.C. 154(b) by 0 days.

(21) Appl. No.: 12/248,691

(22) Filed: Oct. 9, 2008

(65) Prior Publication Data

US 2009/0031366 A1    Jan. 29, 2009

Related U.S. Application Data

(63) Continuation of application No. 10/717,183, filed on Nov. 19, 2003.

(51) Int. Cl.
*H04N 7/173* (2006.01)
*G06F 3/00* (2006.01)
*G06F 13/00* (2006.01)
*H04N 5/445* (2006.01)
*G06F 17/00* (2006.01)

(52) U.S. Cl. ............. 725/86; 725/39; 725/46; 725/61; 725/100; 700/94

(58) Field of Classification Search .......... 725/38, 725/39, 41, 45, 46, 47, 61, 87, 89, 98, 100, 725/134; 700/94
See application file for complete search history.

(56) References Cited

U.S. PATENT DOCUMENTS

| | | | |
|---|---|---|---|
| 5,132,992 A | 7/1992 | Yurt | |
| 5,253,275 A | 10/1993 | Yurt | |
| 5,436,653 A | 7/1995 | Ellis | |
| 5,511,186 A | 4/1996 | Carhart | |
| 5,524,051 A | 6/1996 | Ryan | |
| 5,541,638 A | 7/1996 | Story | |
| 5,550,863 A | 8/1996 | Yurt | |
| 5,572,442 A | 11/1996 | Schulhof | |
| 5,590,195 A | 12/1996 | Ryan | |
| 5,677,953 A | 10/1997 | Dolphin | |
| 5,721,827 A | 2/1998 | Logan | |
| 5,732,216 A | 3/1998 | Logan | |
| 5,751,806 A | 5/1998 | Ryan | |
| 5,809,472 A | 9/1998 | Morrison | |
| 5,815,671 A | 9/1998 | Morrison | |
| 5,892,536 A | 4/1999 | Logan | |
| 5,914,941 A | 6/1999 | Janky | |
| 5,924,068 A | 7/1999 | Richard | |

(Continued)

*Primary Examiner*—Joseph G Ustaris
(74) *Attorney, Agent, or Firm*—Carr & Ferrell LLP

(57) ABSTRACT

A personalized media service provides, e.g., user customization of radio channel selections, immediate availability of multiple preprogrammed and/or customized channels, the ability to intersperse different types of content including periodically refreshed information content, availability of personal radio functions on devices such as car audio systems, PDAs, smartphones, MP3 players, etc. Available channels include, e.g., pre-programmed channels selected for the user based on an interest profile, user-owned content, user-specified recorded content, etc. An audio user interface facilitates user selection of programming and user purchase of currently played audio material. An overall radio experience is thus provided that combines the customization and flexibility of digital media with the immediacy and ubiquity of radio. Video materials may also be accommodated.

9 Claims, 12 Drawing Sheets

U.S. PATENT DOCUMENTS

| | | |
|---|---|---|
| 5,956,629 A | 9/1999 | Morrison |
| 5,979,724 A | 11/1999 | Loewenthal, Jr. |
| 5,986,692 A | 11/1999 | Logan |
| 5,987,525 A | 11/1999 | Roberts |
| 6,002,720 A | 12/1999 | Yurt |
| 6,061,680 A | 5/2000 | Scherf |
| 6,067,278 A | 5/2000 | Owens |
| 6,081,780 A | 6/2000 | Lumelsky |
| 6,088,455 A | 7/2000 | Logan |
| 6,144,702 A | 11/2000 | Yurt |
| 6,154,773 A | 11/2000 | Roberts |
| 6,161,132 A | 12/2000 | Roberts |
| 6,173,112 B1 | 1/2001 | Gruse |
| 6,185,532 B1 | 2/2001 | Lemaire |
| 6,192,340 B1 | 2/2001 | Abecassis |
| 6,199,076 B1 | 3/2001 | Logan |
| 6,230,192 B1 | 5/2001 | Roberts |
| 6,230,207 B1 | 5/2001 | Roberts |
| 6,233,633 B1 | 5/2001 | Douma |
| 6,240,459 B1 | 5/2001 | Roberts |
| 6,246,672 B1 | 6/2001 | Lumelsky |
| 6,253,237 B1 | 6/2001 | Story |
| 6,272,328 B1 | 8/2001 | Nguyen |
| 6,282,511 B1 | 8/2001 | Mayer |
| 6,300,880 B1 | 10/2001 | Sitnik |
| 6,330,334 B1 | 12/2001 | Ryan |
| 6,330,593 B1 | 12/2001 | Roberts |
| 6,393,430 B1 | 5/2002 | Van Ryzin |
| 6,407,750 B1 | 6/2002 | Gioscia |
| 6,421,717 B1 | 7/2002 | Kloba et al. |
| 6,446,080 B1 | 9/2002 | Van Ryzin |
| 6,449,226 B1 | 9/2002 | Kumagai |
| 6,453,252 B1 | 9/2002 | Laroche |
| 6,460,076 B1 | 10/2002 | Srinivasan |
| 6,701,528 B1 | 3/2004 | Arsenault |
| 6,850,252 B1 | 2/2005 | Hoffberg |
| 2002/0054752 A1* | 5/2002 | Wood et al. .................... 386/83 |
| 2003/0086023 A1* | 5/2003 | Chung et al. ................. 348/714 |
| 2003/0088880 A1* | 5/2003 | Martinez et al. ............ 725/133 |
| 2003/0093790 A1 | 5/2003 | Logan et al. |
| 2003/0095791 A1* | 5/2003 | Barton et al. ................. 386/83 |
| 2003/0167318 A1* | 9/2003 | Robbin et al. ............... 709/221 |

* cited by examiner

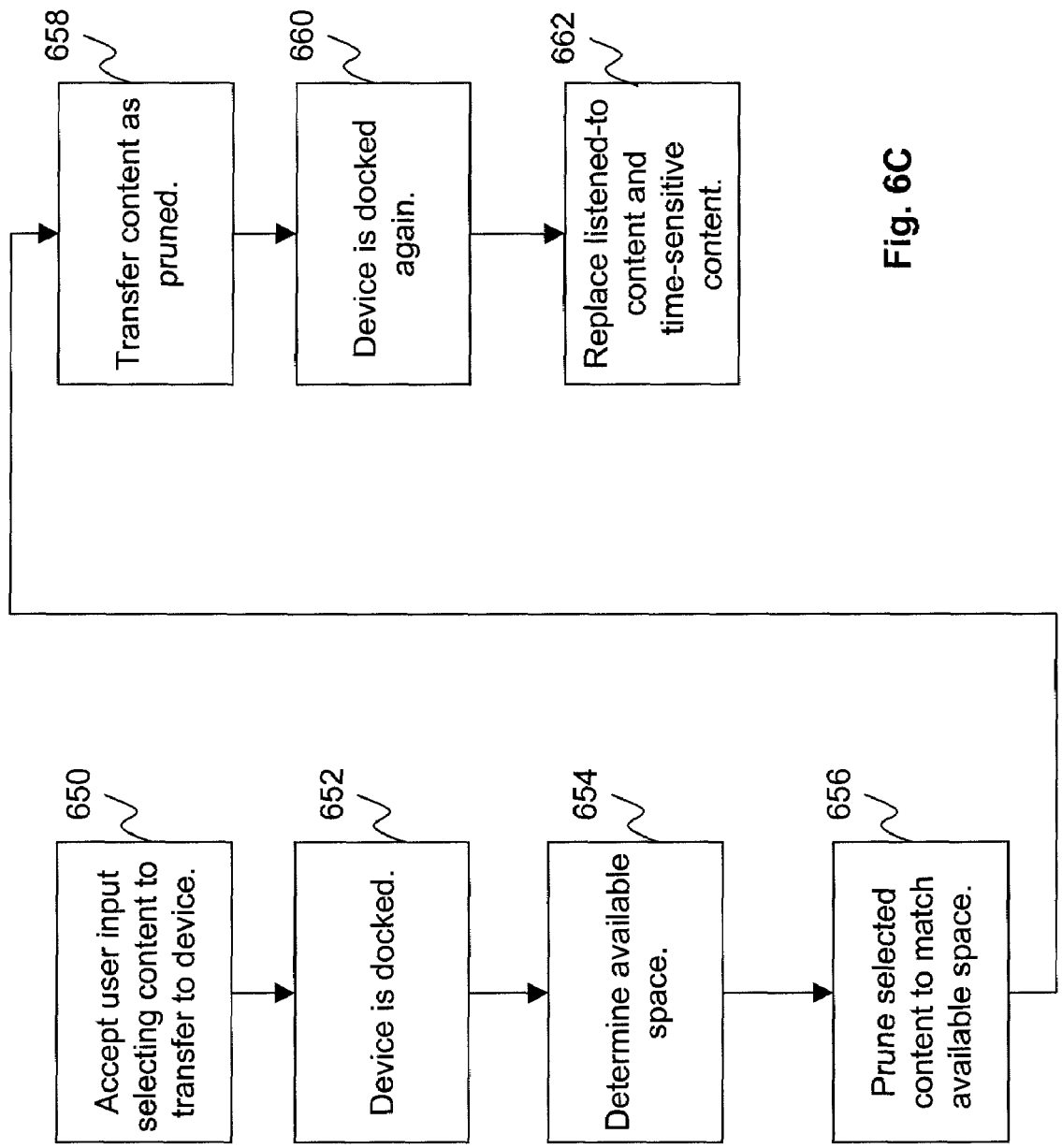

METHOD FOR PROVIDING EPISODIC MEDIA CONTENT

CROSS-REFERENCE TO RELATED APPLICATIONS

The present application is a continuation and claims the priority benefit of U.S. patent application Ser. No. 10/717,183 filed Nov. 19, 2003 and entitled "Personalized Episodic Download Media Service," the disclosure of which is incorporated herein by reference. The present application is related to U.S. patent application Ser. No. 10/717,176 filed Nov. 19, 2003 and entitled "Content Distribution Architecture," the disclosure of which is incorporated herein by reference.

BACKGROUND OF THE INVENTION

The present invention relates to digital media and more particularly, in certain embodiments, to systems and methods for presenting digital media to a user.

Improvements in processor speed, digital storage capacity, and network bandwidth have enabled remarkable advances in the consumer audio and video experience. User control over video experience has been enhanced by personal video recorders that exploit digital storage advances to cache large amounts of video programming for later viewing. Conventional terrestrial and CATV programming delivery choices have been supplemented with digital video content broadcast via cable or satellite as well as high definition satellite and terrestrial broadcasts with high definition cable services being under serious discussion.

The user audio experience has also been transformed. The shift from the traditional phonograph media to compact discs (CDs) in combination with the subsequent wide-scale distribution of personal computers with built-in read/write CD players allowed audiophiles to create their own "favorites" CDs for personal use. More recently, the advent of portable MP3 players allows users to carry their favorite songs anywhere they are. Distribution of music over the Internet has also advanced although certain forms of distribution have proven controversial due to concerns over copyrights.

Another traditional form of audio content distribution is radio. Even with the advent of more advanced audio content distribution technologies, radio continues to be popular. For music listeners, radio offers an element of serendipity in that even if the station selection is indicative of a music type preference, the sequence of songs played will be a surprise and new songs will sometimes be heard for the first time. For those interested in news, sports, and other programming the radio offers frequent updates, potentially interspersed with other types of contents such as music, and easy multitasking with other activities not possible with newspapers and web news sources.

The above-mentioned technological advances have been applied to radio to a certain extent. Digital radio broadcasts are available via the Internet and satellite. Standards have also emerged for digital AM, FM, and shortwave broadcasts. These developments have increased audio fidelity and expanded the number of available stations. However, the full potential of current processing, networking, and digital storage technologies remains unrealized. Users cannot customize radio content to the extent that they can rearrange their stored music content. A broad spectrum of pre-programmed radio content is now broadcast over the Internet but an important part of the appeal of radio is its availability in settings other than adjacent to a broadband internet connection, e.g., in the car, while exercising, etc.

Current Internet broadcasting technologies are also deficient in other respects in comparison to traditional radio. When tuning a conventional radio, one expects immediate access to any selected station whether it be by turning a tuning knob or pushing a preselect button. The listener can almost instantaneously assess his interest in the selected station and either continue listening or move on to another station. In this way, the listener can rapidly assess a large number of audio listening choices. The Internet cannot yet provide this user experience. When the user selects an Internet radio station, he must wait while his computer connects and buffers audio material from the station. This delay, although not necessarily very long, is sufficient to slow user selection among stations and detract from the user experience.

What is needed are systems and methods for combining the customization and broad range of choices associated with digital media with the immediacy, ubiquity and continually refreshed content of radio.

SUMMARY OF THE INVENTION

Embodiments of the present invention provide, e.g, user customization of radio channel selections, immediate availability of multiple pre-programmed and/or customized channels, the ability to intersperse different types of content including periodically refreshed information content, availability of personal radio functions on devices such as car audio systems, PDAs, smartphones, MP3 players, etc. Available channels include, e.g., pre-programmed channels selected for the user based on an interest profile, user-owned content, user-specified recorded content, etc. An audio user interface facilitates user selection of programming and user purchase of currently played audio material. An overall radio experience is thus provided that combines the customization and flexibility of digital media with the immediacy and ubiquity of radio. The present invention also finds application to video materials.

In one exemplary embodiment, a method for providing episodic media is provided. The method includes providing a user with a dedicated episodic media channel and receiving a subscription request to the dedicated episodic media channel from the user. Updated episodic media associated with the dedicated episodic media channel is then automatically downloaded to a computing device associated with the user. The download occurs in accordance with the subscription request of the user.

Further understanding of the nature and advantages of the inventions herein may be realized by reference to the remaining portions of the specification and the attached drawings.

BRIEF DESCRIPTION OF THE DRAWINGS

FIG. 6C depicts is a flowchart describing steps of synchronizing a portable device according to one embodiment of the present invention.

DETAILED DESCRIPTION

Introduction

Embodiments of the present invention provide a very powerful media user interface. A specific application to audio media materials and personalized radio is disclosed but it will be appreciated that other embodiments of the present invention will provide a user interface to video materials or other media.

Audio-related embodiments combine the customizability and wide range of choices of digital media with the immediacy, serendipity, ubiquity, and continually refreshed content of the radio experience. Customized audio content is precached allowing the user to choose among multiple immediately available programming offerings. A PC is used as a staging device to retrieve and organize audio content but the listening experience is not limited to the PC but is also available on a range of portable devices such as MP3 players, PDAs, smartphones, etc.

Embodiments of the present invention are fully sensitive to rights management concerns. While providing local caching of desired content, the content is only available through the user interface that enforces restrictions as appropriate against e.g., rewinding content, propagating content to other users, copying content, etc. Generally speaking, only registered devices may receive licensed content.

Devices and Systems

As has already been mentioned user interfaces of the present invention exploit a variety of systems and devices. Preferably, an appropriately configured personal computer, referred to herein as a "station," is used for radio personalization, management and organization of content, retrieval of content via a network, rights management and enforcement, recording, etc. Playing of content may be done via either the station or a portable device such as MP3 player, PDA, smartphone, car audio system, etc. The station or portable device preferably also allows for convenient listener rating of audio materials to facilitate publisher collection of ratings, easy user access to information about currently playing content, easy purchase of currently playing content, etc.

Figure 1:
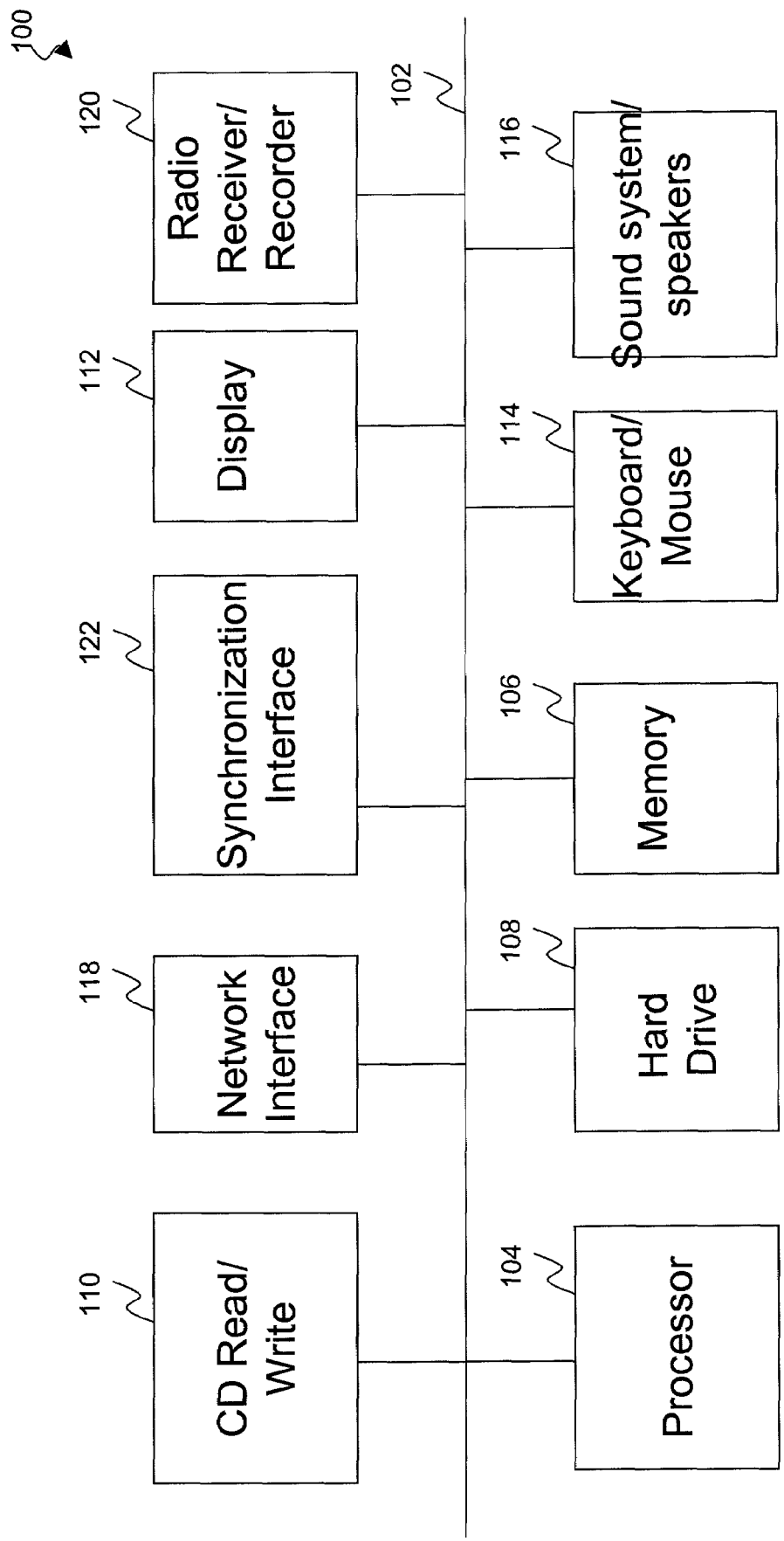
FIG. 1 depicts elements of a computer system according to one embodiment of the present invention.

FIG. 1 depicts elements of a representative personal computer 100 serving as a station according to one embodiments of the present invention. Personal computer 100 may be a laptop computer, desktop computer, etc. The various elements are depicted as being interconnected by a bus 102. However, it will be understood that the actual interconnections among the various elements of a modern personal computer are more complex. Further bus details are not presented because they are not germane to the operation of the present invention. Also, it will be appreciated that various elements may be either inside the computer's structure, outside the computer's structure, or implemented by elements both inside and outside the computer body.

Computer 100 incorporates basic elements such as a processor 104, a memory 106, a hard drive 108, and a CD read/write player 110. Processor 104 typically executes instructions stored in memory 106. The instructions perform the functions of the present invention. Longer term storage of instructions may be on hard drive 106, on a CD accessed through player 110, on other media such as a DVD-ROM, etc. Another example of a computer-readable medium that carries the instructions may be a signal received over a network, i.e., downloading of software.

Another key role of the various memory and storage devices is to store content to be played upon command. For example, audio content may be cached on hard drive 108 and loaded into memory 106 while being played.

Computer 100 also includes various elements to interact with the user. There is a display 112, a keyboard/mouse 114, and sound system/speakers 116. Display 112 and keyboard/mouse 114 facilitate customization and selection of content. Sound system/speakers 116 allow playing of user audio content at the station.

Computer 100 can obtain content in many different ways. For example, content may be remotely retrieved from a network via a network interface 118. Network interface 118 may incorporate one or more of, e.g., an Ethernet interface, DSL modem, cable modem, fiber optic transceiver, wireless modem, etc. Content may also be retrieved from a CD inserted in player 110 or from other media inserted in a appropriate peripheral device. Embodiments of the present invention further provide capturing and recording of audio material received via a radio receiver/recorder 120. Radio receiver/recorder 120 may include capabilities for reception of e.g., conventional or digital AM/FM, conventional or digital shortwave, digital satellite, TV audio, etc. To ameliorate the impact of electromagnetic interference, radio receiver/recorder 120 is preferably located outside the body of computer 100.

Audio content that has been organized and collected on computer 100 may also be transferred to another device for more convenient listening. Accordingly, computer 100 is equipped with a synchronization interface 122. Via synchronization interface 122, selected audio content may be transferred to another device. Also, user selections such as ratings of content, purchase orders for content, may be transferred back to computer 100 for relaying to the content publisher. Synchronization interface 122, may be, e.g., a USB interface, wireless interface such as a Bluetooth interface, etc. Synchronization may alternatively occur across a network by employing network interface 118. For example, synchronization may occur via an IEEE 802.11 network or link, or across the Internet.

Figure 2:
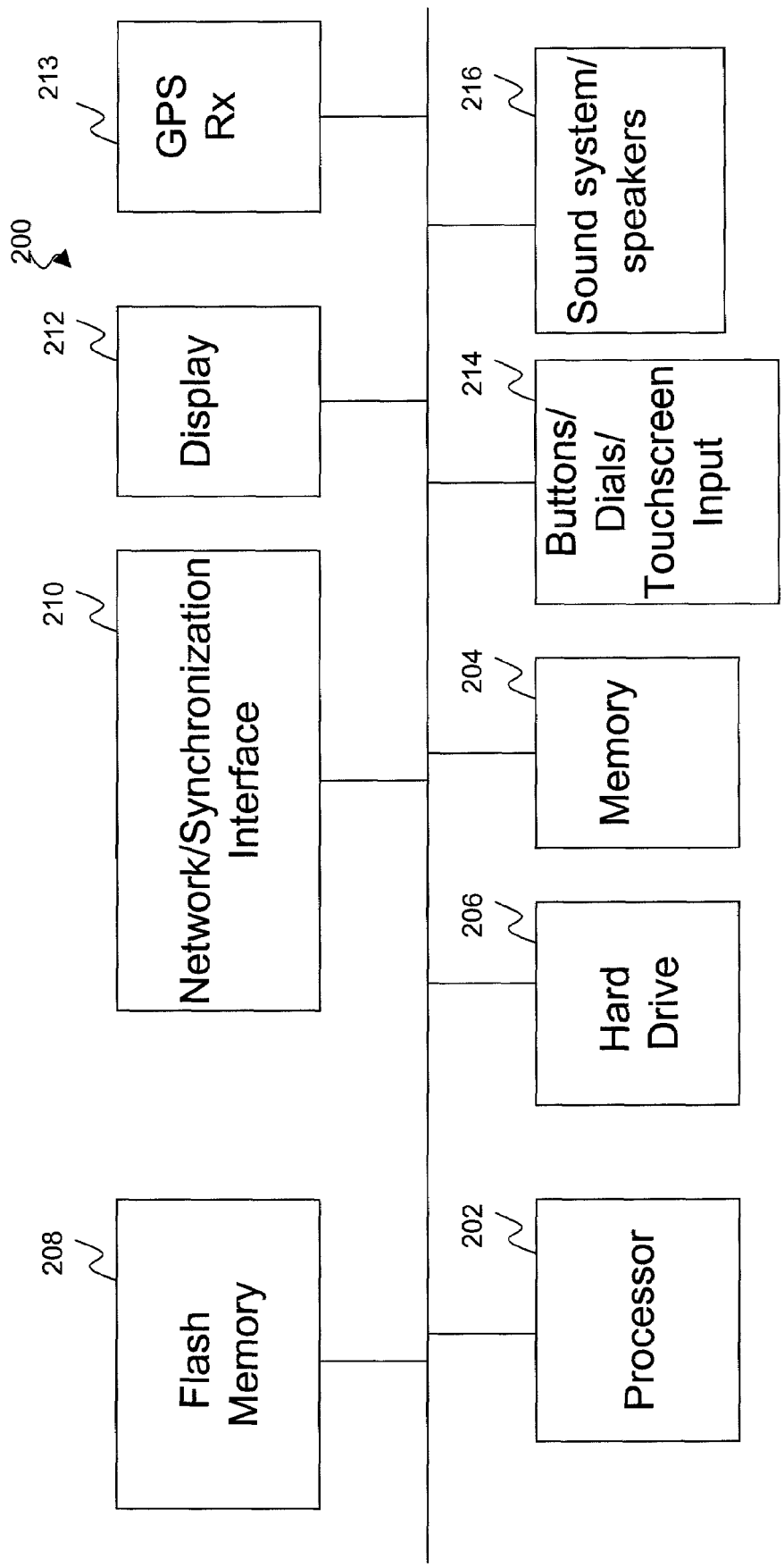
FIG. 2 depicts elements of a portable electronic device according to one embodiment of the present invention.

FIG. 2 depicts elements of a representative portable device 200 configured to implement embodiments of the present invention. Portable device 200 is, e.g., a smartphone, MP3 player, PDA, car audio device, etc. Not all of the depicted elements will necessarily be found in all of the device types. Depicted portable device 200 includes a processor 202, a memory 204, a hard drive 206, and a flash memory device 208. The various memory and storage devices can store instructions to be executed by processor 202 in the course of implementing functions of the present invention. Instructions can also be loaded via a network or other link to a computer or other device. Each of the various memory devices are also usable to store audio content. To provide a high quality customized personal radio service, it is preferable, albeit not absolutely necessary, to have 256 MB of memory available for storage of audio content. Multiple channels of audio content are then preferably available within 250 milliseconds.

Software to implement the present invention may operate in the context of portable device operating system software. Examples of portable device operating software include, e.g., the Palm™ OS, Windows Mobile™, various types of Symbian™ operating system such as Series 60™, UIQ™, etc.

Portable device 200 also includes a network/synchronization interface 210. Network/synchronization interface 210 may provide a short range link to computer 100 via, e.g., a USB connection, a wireless Bluetooth™ connection, a wireless 802.11 connection, etc. To implement a longer range synchronization link, there may be, e.g., a 2.5 G or 3 G cellular interface such as, e.g., a GPRS, EDGE, CDMA2000, UMTS, 1xEV-DO, 1xEV-DV. These types of wireless interface may also be used to download audio content directly from a network including, e.g., news/traffic updates.

In certain implementations, there is also a GPS receiver 213. GPS receiver 213 exploits the Global Positioning System (GPS) to determine a current location of portable device 200. Alternative location determining technologies may also be used.

The user interface features of the present invention exploit a display 212 and an input device 214 that can incorporate buttons, dials, a touchscreen, pen-based input, etc. Sounds system/speaker (or headphones) 216 play audio content and can also play audio cues for the user interface.

Figure 3:
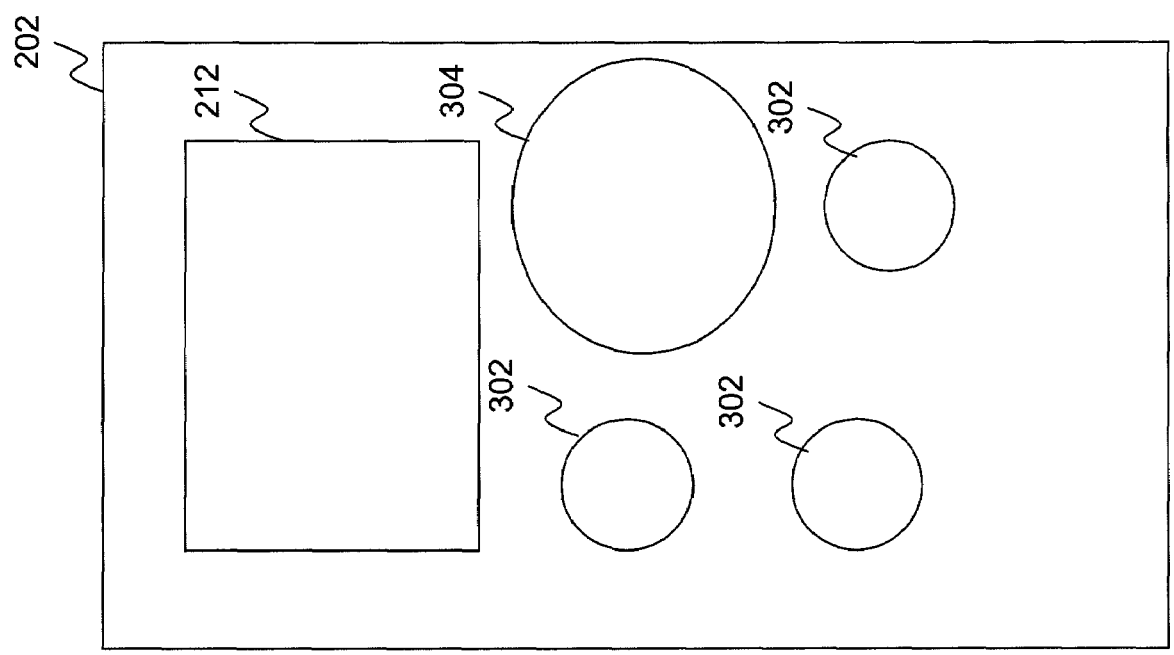
FIG. 3 depicts a physical arrangement of a portable electronic device according to one embodiment of the present invention.

FIG. 3 depicts a physical arrangement of some of the elements of FIG. 2 in a simplified representative portable device 200. Display 212 is positioned above a series of buttons 302 and a jog dial 304 that form a part of input device 214.

Figure 4:
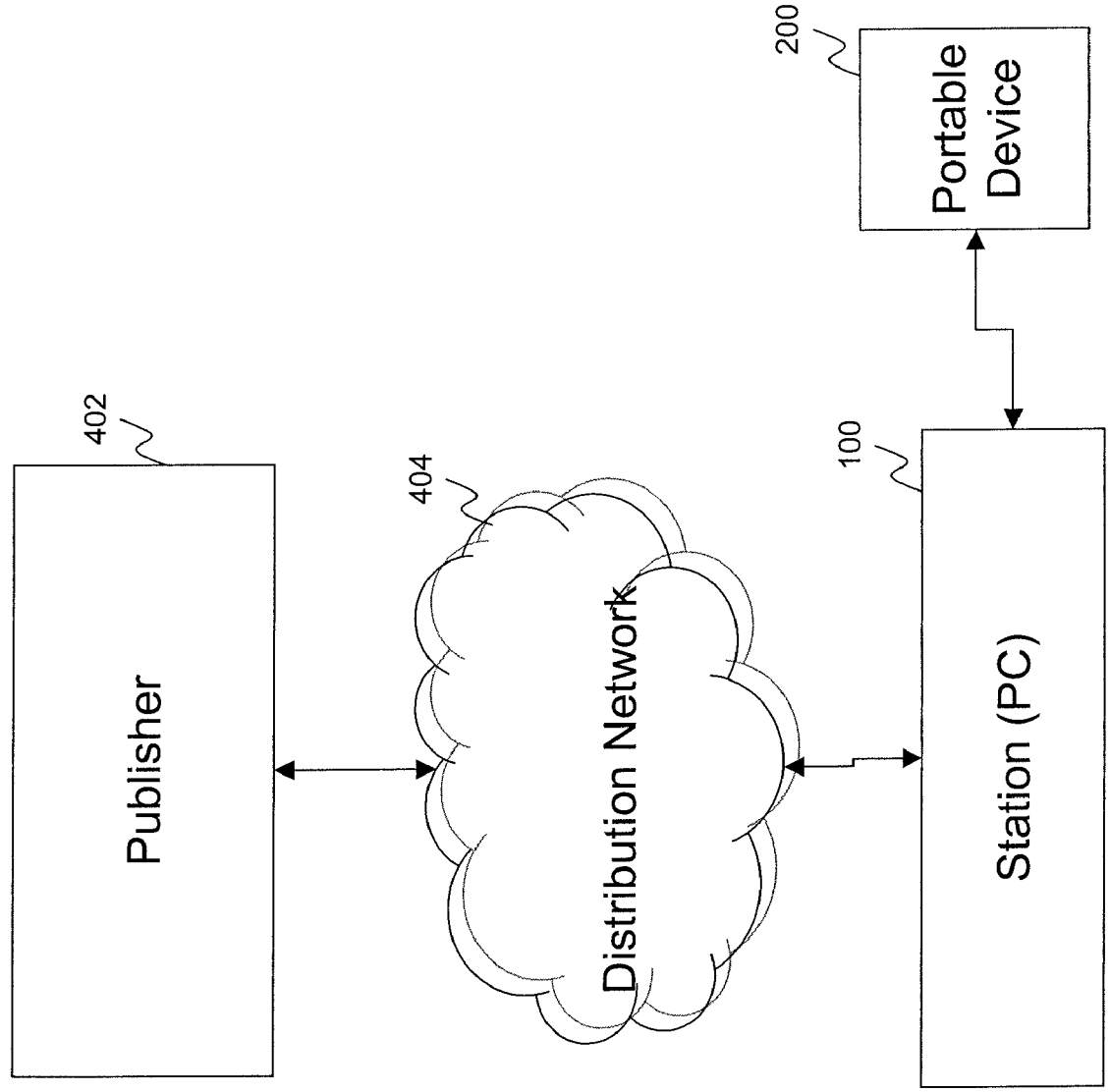
FIG. 4 depicts elements of a content distribution architecture according to one embodiment of the present invention.

FIG. 4 depicts elements of a content distribution architecture according to one embodiment of the present invention. Station (computer) 100 acts as a staging device for audio content. Either station (computer) 100 or portable device 200 may play content. Some of the audio content is pre-programmed by a publisher (or publishers) 402 and propagated via a distribution network 404 operating across the Internet. Details of distribution network 402 are presented in the co-filed application entitled "Content Distribution Architecture." Therein is disclosed a peer-to-peer distribution architecture that provides both quality of service guarantees and protection of ownership rights.

Channels

In the description that follows, a basic unit of media content organization is referred to as a "channel." A channel specifies media content that can be selected by a user for immediate play. By specifying a channel, one does not necessarily specify an order of play. Some channels are specified by a remote publisher and pre-defined from the perspective of the user. Other pre-defined channels correspond to e.g., user-owned media content derived from CDs, DVDs, etc., locally or remotely recorded content from Internet, over-the-air, cable, satellite, etc., text from the web or other source that has been converted to audio, etc. According to embodiments of the present invention, custom channels may be created by a user by way of combining pre-defined channels.

Some publisher-defined channels correspond to music genres and sub-genres. Other pre-programmed channels may include radio shows, news materials, etc. Other types of channels consist of content that the user has separately acquired rights to. For example, a channel may be the contents of a CD that the user has copied onto the station's hard drive. A channel may be a playlist that the user has constructed from multiple CDs.

Embodiments of the present invention also provide the capability to construct channels from recorded content. With appropriate capabilities incorporated within radio receiver/recorder 120, the user may specify radio stations and/or radio programs for recording. An additional feature permits the user to even specify a song, artist, or music genre and have radio receiver/recorder 120 record content conforming to the selected criteria. If, as will often be the case, the content is not appropriately tagged, station 100 will analyze a signature of the content as known in the art and compare it to a remote database to identify the content and determine whether to record it. The recording function may also be performed by a remote server in accordance with the user's criteria with the content being downloaded to the local station. Also, recording, either local or remote, can be extended to Internet-based broadcasters.

The user can define another type of fixed channel by selecting a website and having the station or a remote server convert the text to speech using conventional text-to-speech techniques as known in the art. In this way, a vast range of textual content can be made available as a part of a personalized radio service.

Figure 5:
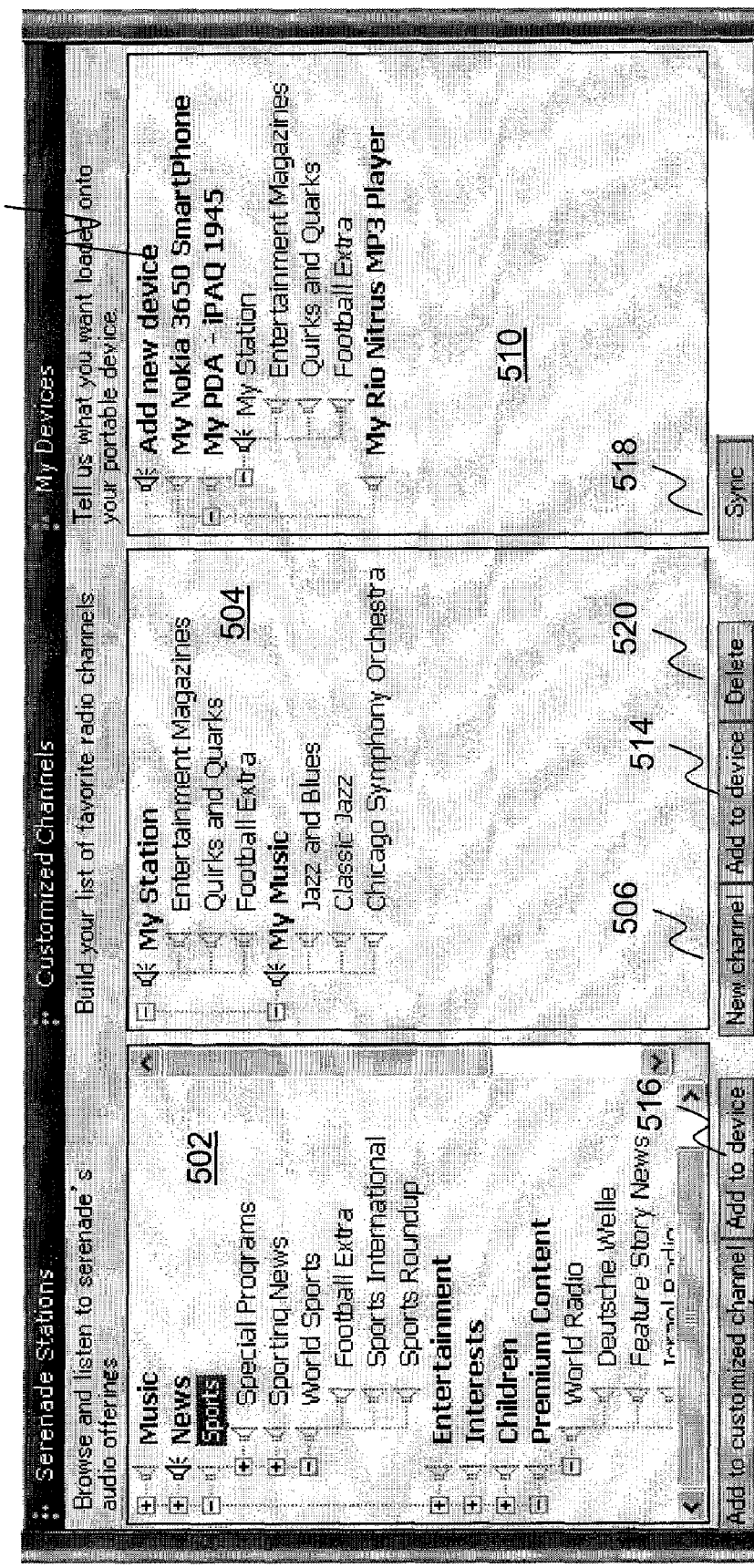
FIG. 5 depicts a channel list according to one embodiment of the present invention.

FIG. 5 depicts elements of a user interface for managing channels and devices according to one embodiment of the present invention. A first screen area 502 shows a list of fixed channels provided by the operator. The channels are presented in a tree structure with certain channels including other channels and so on. By clicking on the "+" or "−" the user can expand or collapse nodes of the tree structure. For example, the music channel preferably includes multiple genre channels, each of which include sub-genre channels, each of which include artist channels, etc. In the depicted example, the "Sports" channel has been expanded to show three constituent channels, of which one, "World Sports," has been expanded to show three constituents.

A second screen area 504 shows user-preferred channels. Some of these preferred channels are custom channels constructed as described below. The depicted "My Station" is an example of such a channel. Other preferred channels include, e.g., user-owned playlists such as the one shown as "My Music." Other channels that may appear here include recorded content and content converted to speech from text. The channels of screen area 504 may also have a tree structure.

User Channel Customization

A personalized radio service according to the present invention may offer many avenues for customization. By querying the user about his or her characteristics and preferences the personalized radio service may select the most suitable selection of fixed channels from a larger universe of choices. Alternatively, the user could select fixed channels from a linear list or tree-structured list.

According to the present invention, the user may also define custom services as combinations of fixed channels. Some of these fixed channels may appear on the list constructed based on the user's query responses and displayed as available for play. Other fixed channels may be so-called "hidden" fixed channels that are also chosen based on the user's query responses but not displayed to the user for separate content play.

Other avenues of customization include the personalized recording, user-owned content, and website text-to-speech features discussed above. Custom channels may also be defined as combinations of these types of fixed channels.

Figure 6A:
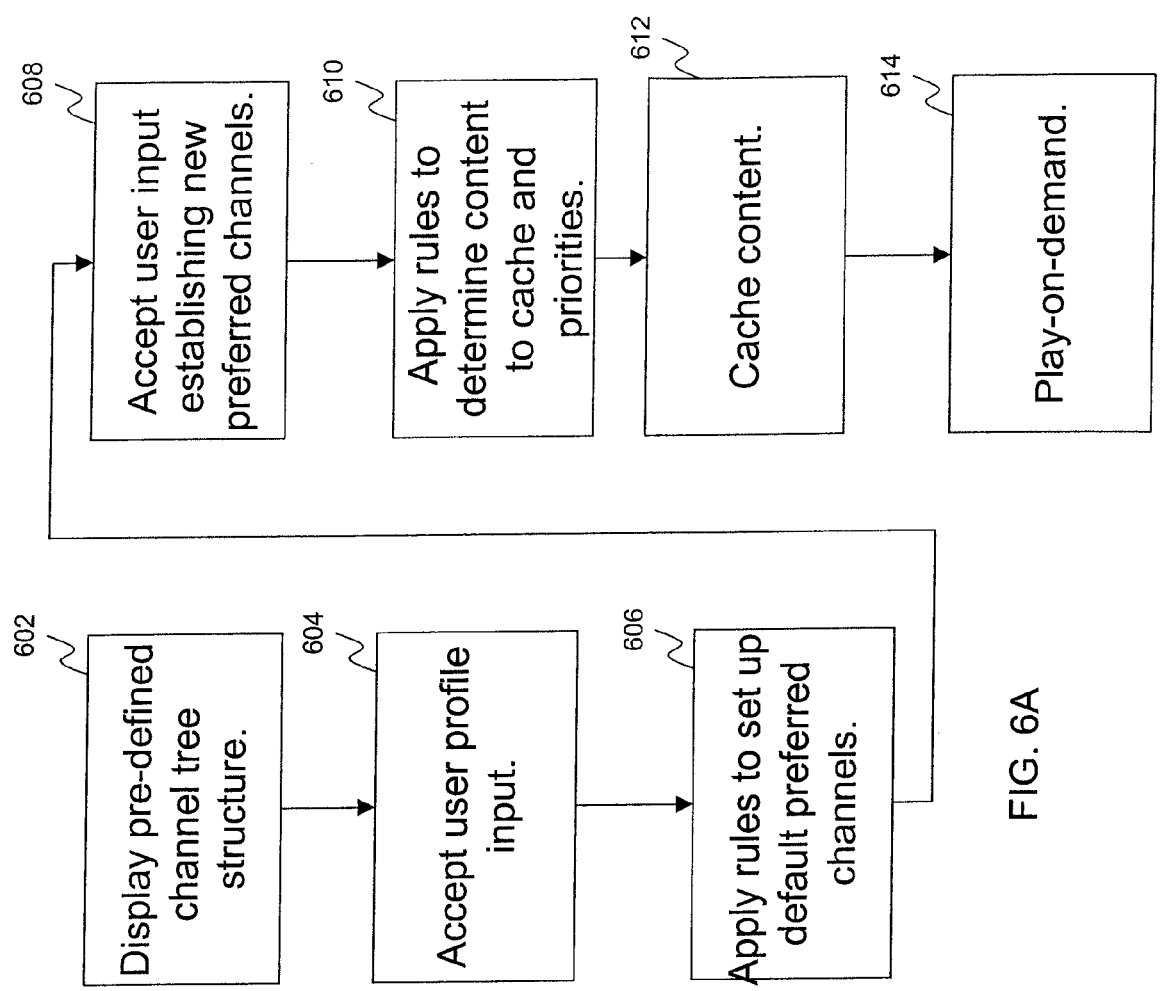
FIG. 6A is a flowchart describing steps of operating a personalized radio service according to one embodiment of the present invention.

FIG. 6A is a flowchart describing steps of radio service personalization according to one embodiment of the present invention. At step 602, the pre-defined channel tree structure shown in screen area 502 is displayed. These channels, or a subset thereof, may be available even prior to user profile input. As will be explained below, a limited amount of content may be cached for each of these initially displayed channels.

At step 604, the user is queried as to his or her interests and characteristics to obtain user profile input. For example, the user may be queried as to home address, gender, income range, educational level, musical interests, hobbies, profession, marital status, number of children, etc. As there may be a relatively lengthy series of questions, in one implementation, registration and capturing of profile information are accompanied by a displayed "co-pilot," an audio-visual character who helps prompt the user and gives words of encouragement in response to the user's entries, e.g., "I like 60s music too!," "Now we're going to ask you a few questions about your family," etc. The co-pilot thus serves a direct practical function by guiding the user through the queries and also makes the personalization tasks less wearisome.

For certain types of input, selection may proceed through dynamic expansion of available choices depending on previous input. For example, if the user selects "Jazz" music from a list of available genres, he or she may then be presented with a list of available sub genres including "Classic," "Blues," "Smooth," and "Vocals."

User profile input may also affect the choices of predefined channels in screen area 502. In some implementations, the user profile input is solicited before any display of the pre-defined channels or any element of the user interface of FIG. 5.

At step 606, the station sets up default preferred channels to list in screen area 504. The default preferred channels are selected by applying rules to user profile input gathered in step 604. The rules themselves are generated centrally and distributed over the network or may be hardcoded into the personalized radio service software. For example if the user indicates that he listens to sports more than rarely, a personalized sports channel may be set up with three constituent channels consisting of special programs, general sporting news, and world sports.

The preferred channels may also be interspersed with commercials, news breaks, or other programming. This programming may take the form of "hidden" channels as discussed below that are selected on the basis of the user profile inputs.

Step 608 represents a process of user-guided establishment of preferred channels. The user can define his own preferred channels. For example, a user can click on a button 506 denoted as "new channel" then populate the new preferred channel by clicking and dragging from screen area 502 or by marking entries in screen area 502 and clicking on button 508 marked "add to customized channel." Any node of the tree structure 502 may be selected for inclusion in a preferred channel. A preferred channel established in this way may also have a tree structure consisting of nodes or subtrees selected from screen area 502 or from other entries in screen area 504. The user-established preferred channels may also be interspersed with material from hidden channels.

The user may further customize a preferred channel by deleting one or more selected nodes from the tree representing a selected preferred channel. For example, the user may be interested in having a preferred channel for a particular combination of music genres but is uninterested in one or more specific subgenres. By deleting nodes representing the undesired subgenres, the preferred channel is further tailored to the user's preferences. A delete button 520 may be used for requesting deletion of nodes.

Channel Prioritization and Downloading

At this point, channels of interest have been determined. Embodiments of the present invention provide a desirable user media experience within the constraints of network bandwidth and available storage space. Accordingly, at step 610, priorities are established for caching of channels. Ideally, all of the content of all the desired channels would be cached but by careful prioritization and updates, the user can gain the desired experience even where bandwidth and storage must be conserved.

For purposes of allocation of storage space and networking bandwidth, each channel may be divided into "programs." A first program includes, e.g., three songs or the time equivalent, sampled at a medium quality level. A second program includes the next seven songs, or the time equivalent, sampled at a higher quality level. A third program includes the remainder of an hour of channel content sampled at the higher quality level. A fourth program includes two more hours of channel content. A fifth program includes the remainder of the channel contents.

Figure 6B:
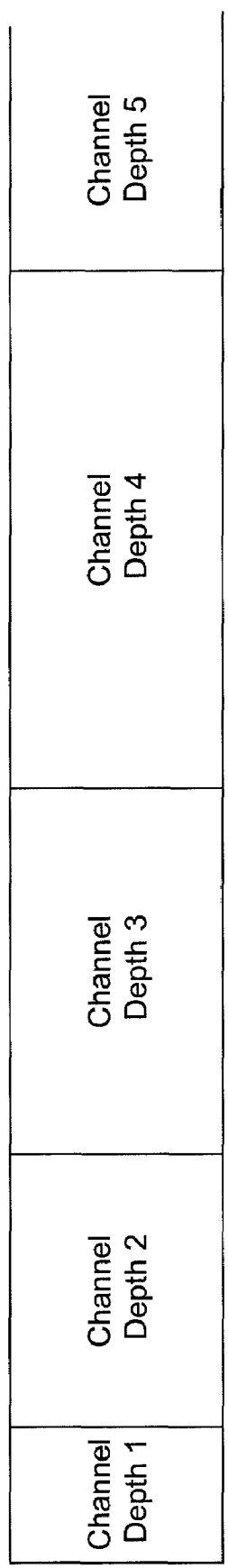
FIG. 6B depicts a channel prioritization scheme according to one embodiment of the present invention.

For each channel, a cached channel depth is defined as illustrated in FIG. 6B.

CD0 (not shown): no content

CD1 includes program 1

CD2 includes programs 1-2

CD3 includes program 1-3

CD4 includes program 1-4

CD5 includes program 1-5.

The storage allocation plan is defined in terms of channel depths. One example plan operates as follows. Initially all of the channels shown in screen area 502 are preferably downloaded to CD1. These predefined channels are then trickle downloaded to CD2 over time. Preferred channels are downloaded initially to CD3 and then trickled to CD4. Further increases in channel depth are then based on available storage space, the time spent by the user listening, and/or specific user input. Channel depth may also be decreased if listening patterns reveal user disinterest. Eventually, channel depth for a rarely used channel may sink to CD0, meaning no storage or bandwidth resources are used for this particular channel.

To determine allocation of download bandwidth, station 100 assigns a priority to each desired program. The configured channel depth of the channel or channels to which a program belongs is one fact. Programs within the desired channel depth of a channel have their download priority increased. Factors other than configured channel depth may also influence priority. For example, download priority may also be increased for time-sensitive content (e.g., news) relative to time-insensitive content (e.g., music). The user may also explicitly program channel depth and priority levels of 0 to conserve storage resources and download bandwidth.

Default channel depths and/or priorities for particular channels may also be set by publisher 402 and overridden locally by individual subscriber action or automatic response to profile input. Furthermore, the default priorities themselves may be based on aggregated preference feedback. Content belonging to a popular channel is thus more broadly distributed.

In one implementation, the user interface is extended to give the subscriber visibility into the current channel depth configurations and caching status. For example, by passing a cursor over a particular node of the displayed tree structure or clicking and selecting configuration information for that node, the user may see the maximum theoretical available channel depth for channels of that node, specified in playtime and/or storage resources, how much of the channel is already locally cached, and how much of the channel is scheduled to be cached. The user then also has the opportunity to directly modify the scheduled caching depth and thus override the previously configured caching depth. This can immediately free up storage resources for caching of other channels.

At step 612, content is cached in accordance with the established priority levels. Caching of content may occur via distribution network 404 in accordance with the techniques described in "Content Distribution Architecture." In one implementation, prior to caching, dummy files are created locally within the allocated storage space. As the actual content is downloaded, these dummy files are overwritten.

Content Play

Step 614 represents the playing of content either on station 100, another station logged into station 100, or portable device 200. Channels may be selected by, e.g., use of radio buttons displayed by station 100, selection of channel entries in the interface depicted in FIG. 5, etc. Alternatively, the dial or buttons of portable device 200 may be used to select channels. A highly beneficial feature of embodiments of the present invention is that the multiple channel selections are guaranteed to be available for immediate play due to the pre-caching. This contrasts sharply with the usual Internet streaming audio experience where the listener must wait as each station is contacted, the material is buffered, etc. In preferred embodiments, each of the multiple channels is available in less than 250 milliseconds, to provide a tuning experience similar to that of conventional radio.

Although individual channels have been downloaded, both predefined and preferred channels will often have a hierarchical structure incorporating other channels as has been described in reference to FIG. 5. Furthermore, other types of content such as commercials and sound effects may be interspersed with the predefined or preferred channels.

Embodiments of the present invention provide that the user's profile input is used to convert the tree structure of a selected channel to a linear playlist. For example, the indicated relative degrees of user preference may be used to allocate playtime among musical genres or subgenres, or among types of information programming. Other rules dictate the frequency of news programming within a channel otherwise devoted to music, etc.

Other rules pertain to insertion of information programming, commercials, etc. within other types of programming. Some of this inserted programming is from channels explicitly included through operation of the user interface. Other inserted programming such as commercials may come from hidden channels that have also been cached.

Typically, insertion points for different types of content will be predefined based on the rules even if the content itself is not yet cached. The user may also select a random mode, particularly for music where constituent channels are selected at random. Also, for preferred channels that include periodic information bulletins, etc., the user has an option to select a "radio-off" feature so that the underlying content, e.g., music, etc. is played without the interruptions.

Step 610 represents the process of transferring cached audio content from station 100 to portable device 200. Portable device 200 may synchronize its locally cached content to what is now available on station 100 whenever the appropriate synchronization interfaces are locally or remotely connected or synchronization may occur via a local connection or over a network by request.

The caching of audio content corresponding to multiple channels allows for play-on-demand of these channels at step 612. This can occur on either station 100 or portable device 102.

Figure 7A:
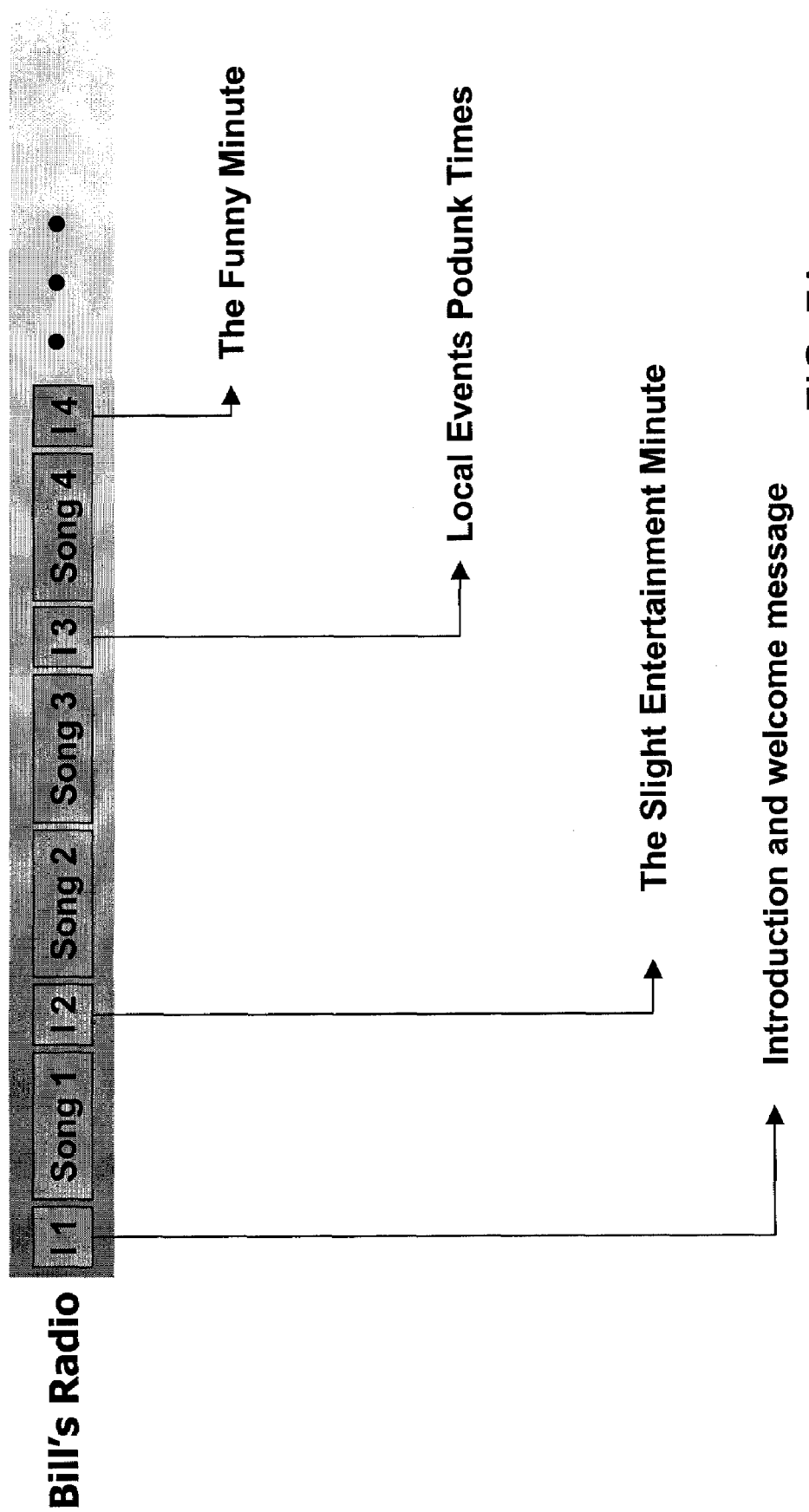
FIGS. 7A-7B depicts the structure of playlists derived from preferred radio channel tree structures according to one embodiment of the present invention.
Figure 7B:
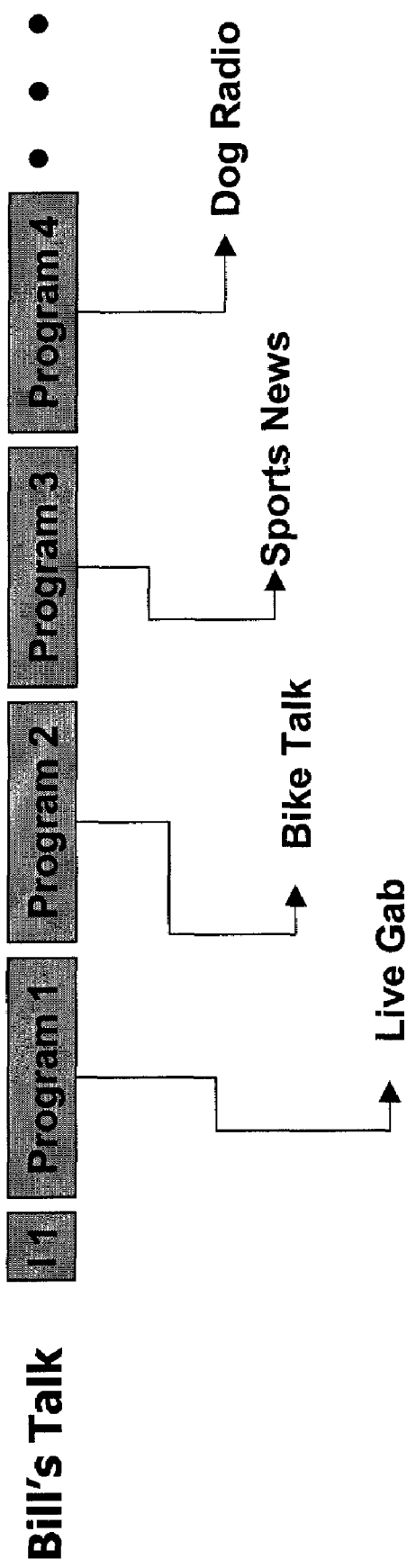

FIGS. 7A-7B depict linear playlists that have been generated from preferred channel tree structures according to one embodiment of the present invention. FIG. 7A depicts a preferred channel including music interspersed with various information bulletins. When the preferred channel starts play, it begins with an introduction and welcome message. Then a "song 1" is played followed by "The Slight Entertainment Minute," an entertainment news program. This is followed by "Song 2" and "Song 3," which are in turn followed by a short news program, "Local Events Podunk Times." Then the user hears "Song 4" and "The Funny Minute," a short comedy program. The songs themselves may be part of one predefined channel or multiple predefined channels selected by the user. Each of the entertainment programs are also supplied by a particular channel.

FIG. 7B depicts a linear playlist derived from another preferred channel, an all-talk channnel. After the introduction message, "I1," the items are "Live Gab," "Bike Talk," "Sports News," and "Dog Radio." Each of these items may be provided by a channel selected by the user for inclusion in the preferred channel. For example, the channel for "Live Gab," may simply consist of one or more episodes of this show.

Figure 8:
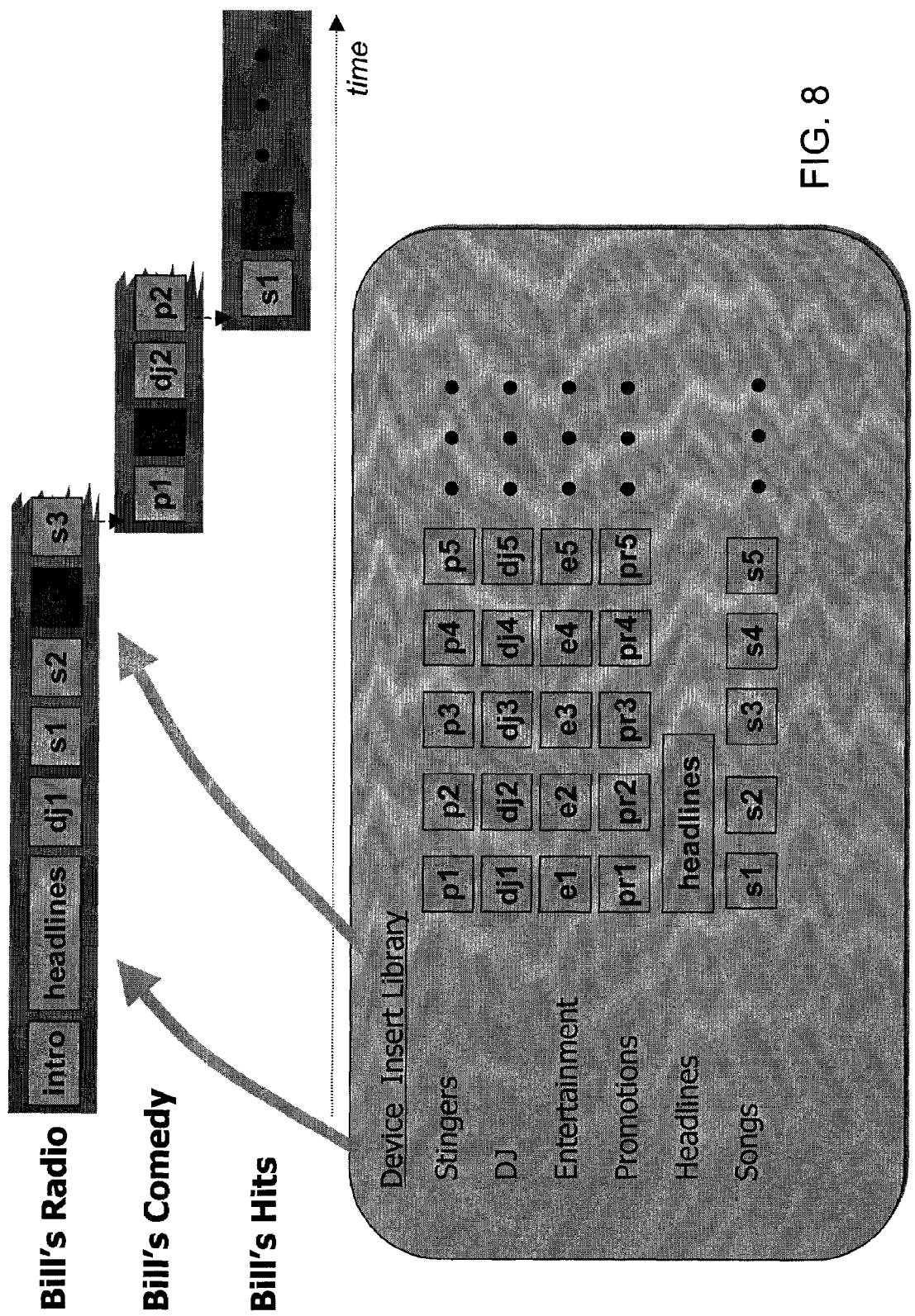
FIG. 8 depicts dynamic playback management according to one embodiment of the present invention.

FIG. 8 depicts how linear playlists are derived from cached content according to one embodiment of the present invention. Three preferred channels are depicted, "Bill's Radio," "Bill's Comedy," and "Bill's Hits." The audio content to play for the constituent channels making Lip these preferred channels is organized as a series of "files." For example, individual songs of a music channel are stored as files "s1," "s2," "s3," etc. Other constituent channels include DJ messages, "DJ1," "DJ2," etc., entertainment items, "e1," "e2," etc., promotion items, "pr1," "pr2," etc., and "Headlines." There are also "stingers," "p1," "p2," etc., sound effects used for identification and announcements. Some of these channels, for example, the stinger and promotion channels are typically hidden from the user interface. The insertion points are predefined when the preferred channels are defined. The playlist is then compiled at time of play based on the currently cached content.

Each of these types is a channel that is cached to a determined channel depth by associating priority levels to constituent programs of the channel, each such program being in turn made up of a set of files. Separate pointers are maintained for each constituent channel. As content from a particular channel is included and played, the corresponding pointer advances. In this way, repetition of content is avoided.

Some channels, particularly channels having promotional content may form a part of the tree structure of multiple preferred channels. It is desirable then to preserve pointer state when the user switches to a different preferred channel. In this way, inserted content such as advertisements will not be prematurely repeated since the pointers will continue where they left off during play of the previously selected preferred channel.

The priority level of content for download may change dynamically in accordance with the listening time devoted to a channel. As listening time increases, a greater channel depth will be requested. This may happen automatically or based on further user input. For example, if the listener completes the available content on a CD(x) channel, she may be prompted for interest in further content. If there is further interest, programs up to CD(x+1) or CD(x+2) are marked for high priority download. Also, if the user's listening exhausts the currently locally cached content, previously played content can be repeated.

Certain types of time-sensitive content such as news may be refreshed more frequently and at regular intervals even at relatively low channel depths. This is done by increasing the priority levels of these programs. For channels that include such periodically refreshed content, the overall effect is to make the whole channel seem fresh while actually consuming relatively little primetime network bandwidth. One can see here a key advantage provided over digital terrestrial and satellite broadcast schemes in that they use expensive wireless bandwidth resources for live streaming of all content even where the content is not time-sensitive. By contrast, embodiments of the present invention exploit the recognition that a large component of the radio experience can be conveyed by content that has been forwarded and stored rather than broadcast in real time. Also, the user listens at times convenient to him rather than having to follow a broadcast schedule.

Synchronization and Transfer of Content to Portable Device

Another aspect of the present invention concerns synchronization between station 100 and portable device 200. Embodiments of the present invention provide a customized radio experience on portable device 200 despite the limited networking capabilities and storage bandwidth capabilities of that device.

FIG. 6C is a flowchart describing steps of performing such synchronization according to one embodiments of the present invention. At step 650, the station accepts user input selecting content to transfer to the portable device. The portable device need not be docked at this time. Referring again to FIG. 5, portable devices are listed in a third screen area 510. The user can add a new device by entering configuration input after selecting entry 512, marked "Add New Device." To add content from a predefined channel to a selected device, the user activates a button 514 marked "Add to Device." To similarly add content from a preferred channel to a selected device, the user activates a button 516, also marked "Add to Device." Other channels such as the hidden channels referred to above are selected for transfer by default without user input.

At step 652, the portable device is docked to the station via any suitable type of connection. The synchronization may initiate automatically upon docking or may occur in response to user selection of a sync button 518. At step 654, the amount of available storage space on the portable device is determined. At step 656, the channels designated for this device are pruned to match the available space. In a preferred embodiment, all of the cached content for each channel remaining after pruning will be transferred to the portable device. Where there is insufficient space, channels may pruned away from the transfer list. Channels to be pruned may be selected by the user after prompting or may be automatically selected based on earlier profile input, or in any suitable way. In an alternative implementation, the channel depths defined by station 100 are shrunk for transferred content such that less content of each channel is transferred but more channels may be portably cached. At step 658, the desired content, as pruned is transferred to the portable device.

At step 660, the portable device is docked again at a later time. In the interim, the user has presumably listened to some of the previously transferred content. At step 662, it is determined which content has been listened to. Step 662 may also determine which content has been refreshed on the station due to time sensitivity. Stale or already played content on the portable device is then replaced. The replacement content may be the content that was pruned at step 656. This preserves the freshness of the radio experience on the portable device.

In certain implementations, distribution of news channels, traffic channels, etc., may be via wireless networks directly accessible to portable device 200 rather than through station 100. This further improves the immediacy of the radio experience while restricting wireless bandwidth demands only to content that benefits from timely updates. Wireless networking demands are further diminished by using packet-based asynchronous downloading that opportunistically exploits available wireless transmission opportunities rather than requiring continuous downloads at fixed times.

In another variation, selection of interspersed content may be based on location information within the portable device. For example, multiple advertising channels may be transferred to the portable device at the time of docking. When content is being played, a particular one of the advertising channels is selected to provide interspersed promotional content based on the current location of the portable device. In this way, the user can hear advertisements of particular relevance to his current location. The location information may be provided by, e.g., GPS receiver 213, or by way of triangulation of among cellular system towers.

Remote Access to Content and Rights Management

Much of the pre-cached content will be subject to copyright restrictions and/or contractual arrangement with the contract owners. Accordingly, there is preferably no direct user access to cached content. The cached content is itself preferably encrypted. There is no capability to transfer the audio content to another station or unregistered portable device without the permission of the operator of distribution network 404.

Where arrangements have been made with the rights owner, the user can employ the personalized radio interface to purchase content. This content will then be copied from the encrypted cache and become available for burning onto a CD, etc. As will be explained below, embodiments of the present invention provide a convenient audio user interface for purchase of currently playing content.

Embodiments of the present invention also accommodate the user's desire to listen to his or her channel selections at another computer, for example, the user's work computer. Station 100 can be configured to stream cached audio to another computer over the Internet. The second computer is configured with appropriate access software. The user enters his or her password at the second computer but then obtains full access to the channels cached at station 100.

The personalized radio service also provides rights-sensitive mechanisms for sharing audio content with friends and community. The user can send selected fixed channel and custom channel specifications to other subscribers to allow them to readily request and play the same content. A messaging structure is built into the service so that text messages can be sent among subscribers along with identifiers specifying channels (both fixed and custom), individual radio programs, and possibly individual songs. Conventional email can also be used for this purpose.

Audio User Interface

Embodiments of the present invention provide a powerful, convenient audio user interface that interprets user actions in the context of currently played content. The user can, e.g., evaluate content, request information on content, purchase content, etc. In one implementation, XML code associated with the file tells the station or portable device how to interpret user actions taken during play of that file. These features allow the user to make requests by simply touching a button even when driving, jogging, etc.

Figure 9:
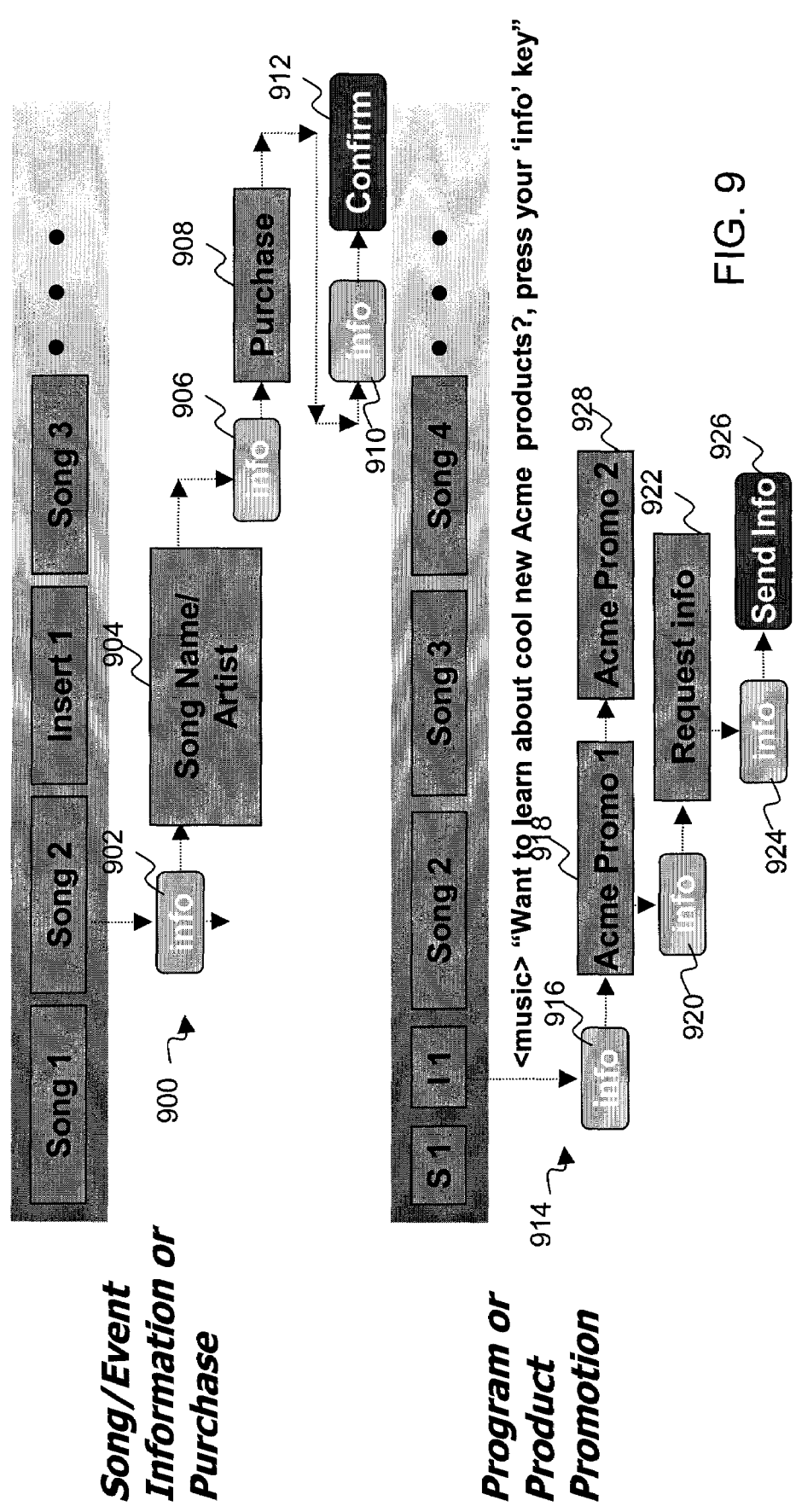
FIG. 9 depicts operation of an audio user interface according to one embodiment of the present invention.

FIG. 9 depicts the sequence of user input and computer requests. In the first interaction 900, the user requests information about a song and can purchase it. A button on portable device 200 or appropriate "virtual button" on the display of station 100 is defined to be an "information" or "action" button. Activation of this button is an example of a user action. In FIG. 9, during "Song 2" there is a first activation 902 of the information button. This causes, as signified by block 904, display of the song name and song artist or, alternatively, playing of speech conveying similar information. This information may be extracted from a meta-tag stored within the content file and then converted into speech. The price of the song may also be conveyed then. A second activation 906 of the information button within a pre-defined time period indicates the user's desire to purchase the song and leads to, at block 908, display or speech of a message indicating the purchase and requesting confirmation. A third activation 910 of the information button leads to confirmation of the purchase at block 912. After that, the user gains additional rights to the purchased content, e.g., the right to burn the content on a CD, the right to rewind the content when it is being played as part of the personalized radio service, etc. Even if the purchase transaction occurs on the portable device, the rights enhancement may be implemented at the station following synchronization.

In a second exemplary interaction 914, promotional content, "I1" is played and the user has a chance to request information on the promoted goods or services. By successive user activations of the information button, the user can navigate through a tree of information options including requesting receipt of an informational email or brochure.

In the example, the promotional content, "I1" includes music and a spoken message, "Want to learn about cool new Acme products?, press your info key." A first activation 916 of the information button leads to playing of a first promotional audio item 918, perhaps describing a first Acme product. A second activation 920 of the information button during first promotional audio item 918 is interpreted as a request for information and a message 922 requesting confirmation is displayed or spoken. A third activation 924 of the information button then actually leads to the requested information being sent or emailed at block 926. Alternatively, if the first promoted product is not of interest, a second promotional item 928 about a second Acme product is played. Activation (not shown) of the information button during second promotional item 928 would indicate interest in information about the second product.

Another feature of the audio user interface plays a brief announcement message when a channel is selected. This can be a message announcing the channel, facilitating tuning among channels when the user is driving or otherwise unable to focus full intention on a visual display. The announcement message may consist of content extracted from a meta-tag associated with the channel and converted to speech.

Another feature of the audio user interface provided by embodiments of the present invention is how user interface-related interruptions to currently played content are handled. The currently played content pauses to allow playing of a user audio interface prompt. After the prompt is played, play of the content resumes where it left off.

A selected button on the portable device or virtual counterparts on the station can also be used to skip undesired content. These skip commands can be tracked and reported to publisher 402. Also, as the listener hears content, he or she can evaluate it. In one simple evaluation scheme a first button is used to indicate approval of the content while a second button is used to indicate disapproval. This feedback can also be reported to publisher 402.

Publisher Interface

Embodiments of the present invention provide publisher 402 as a powerful and convenient tool for distributing audio content, soliciting purchase of the content or other goods, and soliciting and collecting feedback about the content. Publisher 402 need not incorporate distribution network functionality but rather only prepares audio material for injection into distribution network 402 along with appropriate catalog entries identifying the contents. Details of this process are discussed in greater detail in the co-filed application, "Content Distribution Architecture." An advantage of the publishing scheme is that the publisher need not operate the distribution network or operate servers that host large amounts of audio content. New content need be injected into distribution network 402 only once.

In addition to injecting audio content into distribution network 404, publisher 402 also receives information back from listeners. The received information may also be collected by a separate node or nodes. The received information can include information about content desirability including, e.g., counts of skips for particular content, up and down votes, etc. Content desirability information can be used to set default priority levels as described above. Although preferably the user input will be anonymous, demographic information based on user input at time of registration can be collected and correlated to user responses. The received information can also include purchase orders and requests for information.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents. For example, the order of processing of flowchart steps is merely representative. Steps that are depicted as occurring in series may instead occur in parallel. Steps may be skipped, other steps may be added, etc.

What is claimed:

1. A method for providing episodic media, the method comprising:
    providing a user with access to a channel dedicated to episodic media, wherein the episodic media provided over the channel is pre-defined into one or more episodes by a remote publisher of the episodic media;
    receiving a subscription request to the channel dedicated to the episodic media from the user;
    automatically downloading updated episodic media associated with the channel dedicated to the episodic media to a computing device associated with the user in accordance with the subscription request upon availability of the updated episodic media, the automatic download occurring without further user interaction; and
    providing the user with: an indication of a maximum available channel depth, the channel depth indicating a size of episodic media yet to be downloaded from the channel and size of episodic media already downloaded from the channel, the channel depth being specified in playtime or storage resources, and the ability to modify the channel depth by deleting selected episodic media content, thereby overriding the previously configured channel depth.

2. The method of claim 1, further comprising automatically providing the user with an indication of the availability of updated episodic media via the channel dedicated to the episodic media in accordance with the subscription request.

3. The method of claim 1, further comprising synchronizing the updated episodic media automatically downloaded to the computing device associated with the user with a portable computing device communicatively coupled to the computing device associated with the user.

4. The method of claim 3, wherein synchronization of the updated episodic media automatically occurs in response to a predetermined user setting.

5. The method of claim 3, wherein synchronization of the updated episodic media occurs in response to a request received from the user.

6. The method of claim 1, wherein the updated episodic media is made available to users not associated with the computing device over a local area network.

7. The method of claim 1, wherein the automatic download is further based on a priority assigned to the channel.

8. The method of claim 3, wherein the channel dedicated to the episodic media is reduced in size during synchronization in order to fit available cache storage within the portable device.

9. The method of claim 1, wherein the channel dedicated to the episodic media is modified in size by removing one or more episodes of episodic media.

\* \* \* \* \*